United States Patent [19]

Wirsing

[11] 4,456,987

[45] Jun. 26, 1984

[54] DIGITAL SWITCHING NETWORK

[75] Inventor: Howard L. Wirsing, Schaumburg, Ill.

[73] Assignee: International Telephone and Telegraph Corporation, New York, N.Y.

[21] Appl. No.: 360,734

[22] Filed: Mar. 22, 1982

[51] Int. Cl.³ .......................................... H04Q 11/04
[52] U.S. Cl. ................................................... 370/58
[58] Field of Search ...................... 370/58, 65, 59, 66, 370/67, 68

[56] References Cited

U.S. PATENT DOCUMENTS

| 4,107,480 | 8/1978 | Schlichte | 370/58 |
| 4,201,889 | 5/1980 | Lawerence et al. | 370/68 |
| 4,201,890 | 5/1980 | Lawerence et al. | 370/68 |
| 4,317,193 | 2/1982 | Joel, Jr. | 370/58 |

OTHER PUBLICATIONS

J. Terry et al., "DMS-200 Traffic Peripherals", ICC 1978, Jun. 4–7, 1978, pp. 32, 33, 1–6.
P. Richards, "Technological Evolution–The Making of a Survivable Switching System", 3rd World Telec. Forum, Sep. 1979, pp. 1, 2, 6, 1–8.
R. Galimberti et al., "Proteo System: An Overview", CSELT Rapporti Technici, vol. IX, No. 5, Oct. 1981, pp. 501–508.

Primary Examiner—Douglas W. Olms
Assistant Examiner—Wellington Chin
Attorney, Agent, or Firm—John T. O'Halloran; Jeffery P. Morris; Alfred C. Hill

[57] ABSTRACT

The switching network includes in one or more planes MN switching means arranged in M rows and N columns, where M and N are even integers, first intermediate switching devices associated with the M rows and second intermediate switching devices associated with the N columns. Each intermediate switching device associated with a given column is coupled to a different one of the M rows and each intermediate switching group of the second intermediate switching device is coupled to a different one of the N columns. Each of the MN switching means has a first plurality of ports coupled to a plurality of digital terminals, a second plurality of ports associated with a different one of the M rows and a third plurality of ports associated with a different one of the N columns. Each of the first intermediate switching means having a fourth plurality of ports each coupled to a given one of each of the second plurality of ports in an associated one of the M rows and each of the second intermediate switching means having a fourth plurality of ports each coupled to a given one of each of the third plurality of ports in an associated one of the N columns.

20 Claims, 11 Drawing Figures

DIGITAL SWITCHING NETWORK

BACKGROUND OF THE INVENTION

The present invention relates generally to distributed control digital communication and computer systems, to digital switching networks and to telephone exchanges for providing expandable subscriber line/trunk traffic capacity for toll, tandem, rural, local, concentration and expansion applications. The present invention also relates to multiprocessor communications systems in which certain of the data processing functions associated with groups of telephone or other terminals are provided by one group of processors, while other processing functions associated with different and larger groups of the telephone and other terminals are provided independently by a second group of processors, while communication and data exchange between the two groups of processors is provided over common transmission paths through a digital switching network.

In modern telephone switching systems, it is presently required that data representative of status of the subscriber lines and trunks served by such a switching system, together with required actions by the switch in response to various line and trunks status conditions be stored. Representative data is path set-up through the network, subscriber class of service, trunk class of call, directory number to equipment number translations, equipment number to direct renumbered translations, etc. In prior art centralized systems, this data is available in a common memory, which is duplicated for security and reliability purposes and is accessible by common control computers for serial operations upon the extracted data. Multiprocessing common control systems of the prior art require more than one processor to access the common memory to obtain data at the same time, resulting in interference problems and an effective loss of throughput, which increases as the number of processes increases.

Decentralization of control and distributed data processing has evolved in light of the problems inherent in a centrally controlled system. A prior art switching system wherein stored program controllers are distributed throughout the system is described by U.S. Pat. No. 3,974,343. Another prior art progressively controlled distributed control switching system is described in U.S. Pat. No. 3,860,761.

Prior art systems have concentrated upon obtaining a high efficiency for the processing function, with multiprocessing providing increased processing capability; however, with resultant undesirable interaction between software packages where the modifications or addition of features could interfere with the current working of other features in an unpredictable manner. A major reason for the problems of prior art common control architectures, whether or not multiple processors are used, is that stored program control processing functions are shared in time between a plurality of tasks which randomly occur on demand of the originating and terminating traffic, which does not provide for an efficient operation of the stored software packages.

To overcome the above-mentioned difficulties of the prior art common control architectures a preliminary switching network, hereinafter identified as the B1 network, was developed which requires no separately identifiable control or centralized computer complex; rather, multiple processors distributed throughout the subsystems of a switching network provide the contol for the switching network with such distributed processors providing groups of necessary processing functions for the subsystems serviced. Thus, groups of control functions for certain subsystems are performed by processors dedicated to these subsystems; however, other processing functions of the same subsystems which may be more efficiently performed by other processors are performed by such other processors.

From this preliminary B1 switching network has evolved a digital switching network which is an improvement over the preliminary B1 network and is fully described in U.S. Pat. Nos. 4,201,889; 4,201,890 and 4,201,891, whose disclosure is incorporated herein by reference. These patents describe a digital switching network arrangement which does not provide a separately identifiable control centralized computer complex with the control for the switching network being in form of multiple processors distributed throughout the subsystems, with such distributed processors providing groups of necessary process functions for the subsystems serviced. Thus, the digital switching networks described have groups of control functions for certain subsystems which are performed by processors dedicated to those subsystems; however, other processing functions of the same subsystems which may be more efficiently performed by other processors are performed by such other processors.

Also, in accordance with the above-cited patents, a switching network architecture is provided wherein not only are multichannel digitized PCM (pulse code modulation) speech samples or data between one terminal and another coupled to the network, but the same channels also contain the path selection and control signals for the distributed control, which are carried on the same transmission paths through the network. Every terminal, whether carrying data from a line or trunk or other data sources is serviced by a terminal unit which contains all of the facilities and control logic to communicate with other terminals via other terminal units and to establish, maintain and terminate paths through the switching network to other terminal units. All interprocessor communication is routed through the switching network. A group switch containing switching elements providing both time and space switching is provided which is modularly expandable without disruption of service or rearrangement of existing interconnections to provide a growth from approximately 120 to 128,000 or more terminals, to accommodate increasing traffic load while performing as an effectively nonblocking network. A failed switching element is easily and automatically identified, isolated and bypassed by traffic.

In accordance with the above-cited U.S. patents a group switch is provided in which multiport single sided switching elements are arrangeable in an inlet-outlet configuration, for example, as $8 \times 8$ switches containing space and time switching in a ST configuration. The path selection throughout the network of switching elements is provided by control commands carried by speech channels. Further, reflection switch facilities are provided so that a path setup, for example, in a stage two switch, when no stage three is yet provided, will be reflected back via the speech path to form a folded network, while the outlets of the stage two switch remain available for future connection for network expansion. The expansion to a third stage would then require connection of the available outlets of stage two to the inlets of the future state three switch.

SUMMARY OF THE INVENTION

An object of the present invention is to provide still another improved digital switching network based upon a nodal network structure rather than a traditional link network. In such a nodal network, terminals served are uniformly distributed throughout the network.

A feature of the present invention is the provision of a switching network for selectively connecting one terminal which is a source and a destination of digitally encoded information through the network to another similar terminal which is also both a source and a destination of digitally encoded information. Said terminals are connected to the network by a transmission path through the network comprising in at least one plane including MN switching means arranged in M rows and N columns orthogonally related to each other, where M and N are even integers, each of the MN switching means having a first plurality of ports coupled to a plurality of said terminals, a second plurality of ports are each connected to an intermediate switching device that in turn couples all said ports to each other for the M rows. A third plurality of ports are each connected to an intermediate switching device that in turn couples all said ports to each other for the N columns. The first, second and third plurality of ports are interconnected internally of each of the MN switching means. The previously identified intermediate switching devices are each made up of a fourth plurality of ports interconnected internally and connected to the second plurality of ports (for connecting rows) and to the third plurality of ports (for connecting columns) of each of the MN switching means in a particular row or column. Each of the first, second, third and fourth plurality of ports has two oppositely directed external unidirectional paths coupled thereto. Each of the unidirectional paths has a plurality of digital information channels transmitted thereon in a time division format. Each of the plurality of channels carries digital information and control for each of the plurality of terminals. The MN and intermediate switching means are responsive to the control originating at any one terminal to establish a transmission path through the network.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The digital switching network disclosed herein is an application of nodal network principles. The basic principle employed in the digital switching network of the present invention is to allow the first stage switching device to be used for both locally originating and terminating traffic and for tandem traffic which neither originates nor terminates on the terminal ports of the first stage switching device. The switching device utilized allows any port to be connected to any other port of the device. Such a switching device is fully disclosed in the above-cited U.S. Pat. Nos. 4,201,889; 4,201,890 and 4,201,891, whose disclosure are incorporated herein by reference.

In addition to the first stage of switching, which is referred to herein either as the MN switching means or termination switch (TS). A second linking level of switch, referred to herein either as the intermediate switching means or a link switch (LS), is used to interconnect the termination switches.

Employing these two components, a network topology or architecture will result that provides a nearly non-blocking switching network that is distributed in character, grows nearly linearly in equipment demand with only additions required, and requires significantly fewer switching elements and, therefore, less wires and cables than prior art link networks.

Another characteristic of the topology of the present invention is that it is planar in character with a possibility of some terminal switches having access to more planes of the network than others. This creates the possibility of structuring digital switching networks that have different blocking probabilities for one set of terminals versus another.

With the proposed topology, it is possible to construct digital switching networks that are essentially non-blocking ($10^{-10}$ or better on a single attempt basis) for terminal quantities from 240 terminals (lines or trunks) to 64K terminations assuming a single 30 circuit or terminal cluster per terminal switch input. These circuits can all be trunks operating at 1E per circuit, where 1E refers to one Erlang, which is the international dimensionless unit of traffic intensity in a traffic path continuously occupied. Even with the assumption that the 16-port switching device is a limit possible for such devices, 64K circuits can be implemented without concentration with all of the circuits operating at 1E.

Figure 1:
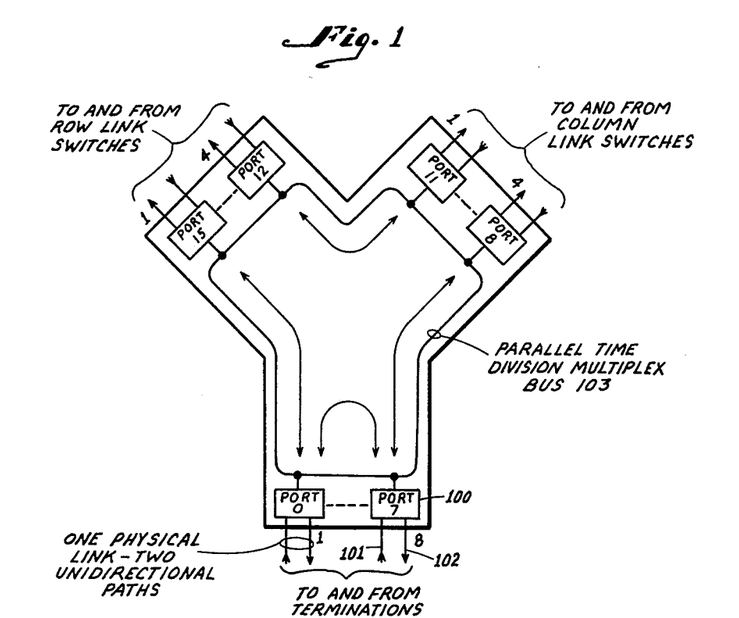
FIG. 1 is a block diagram of the MN switching device (row, column and terminal switch) employed in the digital switching network of the present invention.
Figure 2:
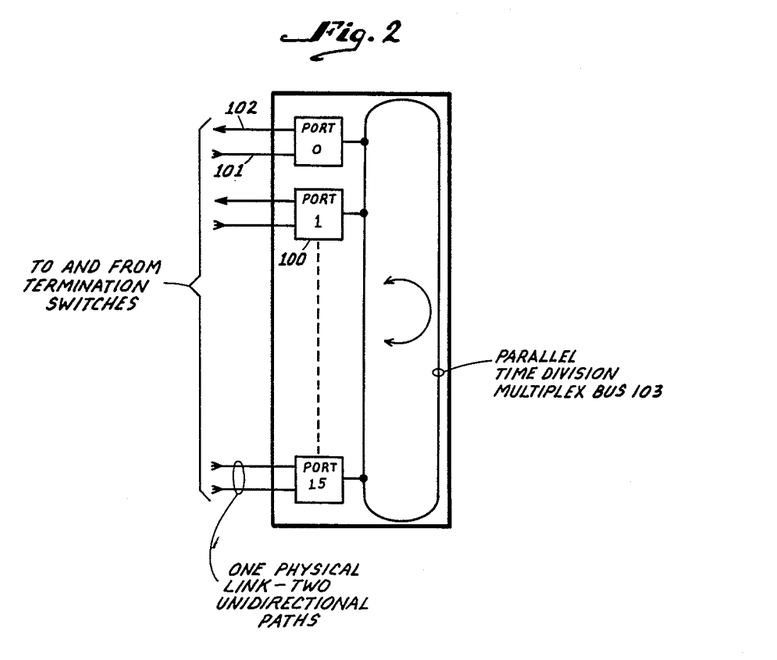
FIG. 2 is a block diagram of a link switch (intermediate switch) employed in the digital switching network of the present invention.

The basic 16 port switching element described in U.S. Pat. Nos. 4,201,889; 4,201,890 and 4,201,891 has most of the characteristics needed to implement the topology of the digital switching network of the present invention. FIGS. 1 and 2 show two different forms of the switching element. Both of the switching elements are essentially 16-port devices with each port capable of having 32 channels with two channels reserved for control communication. Each port has a separate receive and send link with each of these links operating in the 32 channel format. Any incoming channel on any of the 16 ports can be connected on a TDM (Time Division Multiplex) basis to any outgoing channel on any of the 16 ports, including its own, through the parallel time division multiplex bus 103.

This basic characteristic is taken advantage of to structure two types of switching elements. One is the termination switch (TS) shown in FIG. 1 and the other is the link switch (LS) shown in FIG. 2. The termination switch TS of FIG. 1 is structured so that eight of its ports are reserved for connection to the attached traffic sources and sinks. Any terminal can be connected to trunks without any limitations.

In addition to the termination ports, four ports are reserved for connection to what will be called row link switches and the remaining four ports will be connected to what will be called column link switches.

It will be possible for a connection to be established in either direction from any termination port to any other termination port connected to the switching network. It will also be possible to establish a connection between either the row or the column link switch ports and the termination ports. And finally, it is possible also to establish a connection between the row and column link switch ports. In order for the termination switch to be able to distinguish between connections to be made to the termination ports and the link ports, it is necessary that the termination switch know its own identity. As will be seen later, this requires an 8-bit identity. This identity can either be set by programming switches directly associated with each termination switch or it can be delivered to the termination switch through communication over one of the control channels from a terminal device.

The link switch of FIG. 2 is structured so that all 16 ports can be used for connections to the termination switches such as illustrated in FIG. 1. Any of the 16 ports will be able to communicate with any other of the 16 ports, based on the receipt of a 4-bit destination address. It should be noted that it is not necessary that this link switch be programmed as a row or column switch, since the termination switch can format the incoming address data so that the selection process is fixed for both cases.

The choice of network topology is dependent upon capabilities inherent in the switching element used to implement the network. The crossbar switch, the crosspoint switch, and the step-by-step switch all lead to somewhat different optimized network topologies. The same is true for the 16-port devices identified hereinabove with respect to FIGS. 1 and 2.

From here on the MN switching means of FIG. 1 will also be referred to as a Y switch because of its similarity to the letter Y, and the switching network will be referred to as a Y switch network.

The switching element has several important capabilities that can be exploited in addition to its time division aspect. the first is that there is no defined organizational relationship inherent to the switching device. Any port of the switching device can have any of its channels associated on a full time basis with any channel of any other port. This can be simultaneously true for all channels on all ports on a paired basis. Also, because of the solid state wired logic of the switching element, algorithmic response to the data or control signals can be wired into the switching element without imposing serious cost penalties. Thus, switch identity information, as well as sophisticated routing algorithms can be provided.

Figure 3:
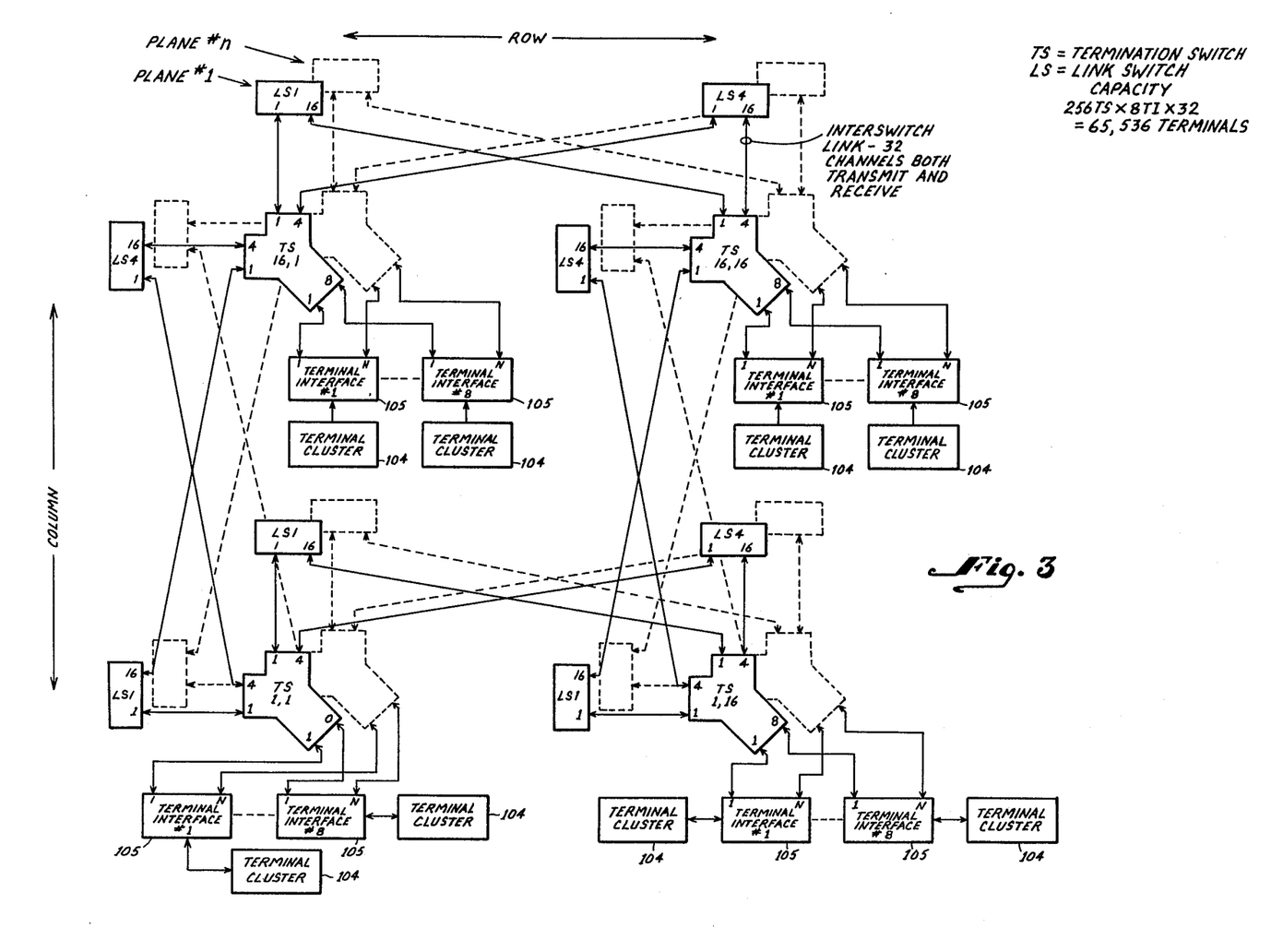
FIG. 3 is a block diagram illustrating one embodiment of the nodal digital switching network topology in accordance with the principles of the present invention.

FIG. 3 is a block diagram illustrating the employment of the Y switch of FIG. 1 and the link switch of FIG. 2 to provide a digital switching network topology that utilizes these two switching elements. Each TS switch is interconnected to all other TS switches in the same row by means of as many as four LS switches. Each TS switch is also interconnected to all other TS switches in the same column by means of as many as four LS switches. Thus, a grid of $M(16) \times N(16) = (256)$ MN switches can be interconnected by intermediate switching means associated with the M rows, where as many as four intermediate switching means may be provided for each row and as many as four intermediate switching means may be provided for each column. This allows a channel path to be established from any termination channel of any TS switch to any other channel of any other termination switch.

Figure 4A:
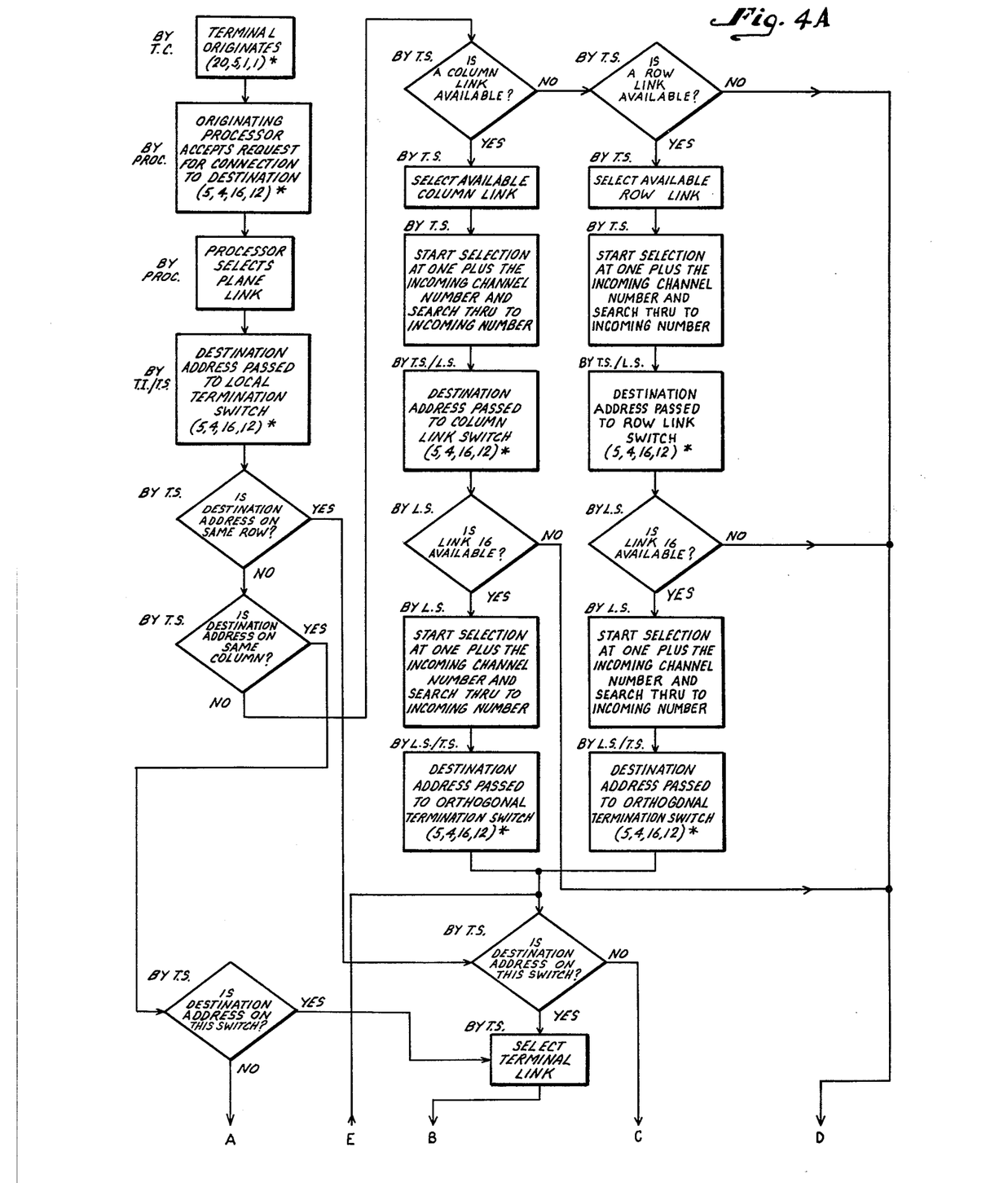
FIGS. 4A and 4B, when organized as illustrated in FIG. 4C, illustrates a flow chart of the digital switching network of FIG. 3 showing the path selection logic sequences taking place therein.
Figures 4B, 4C:
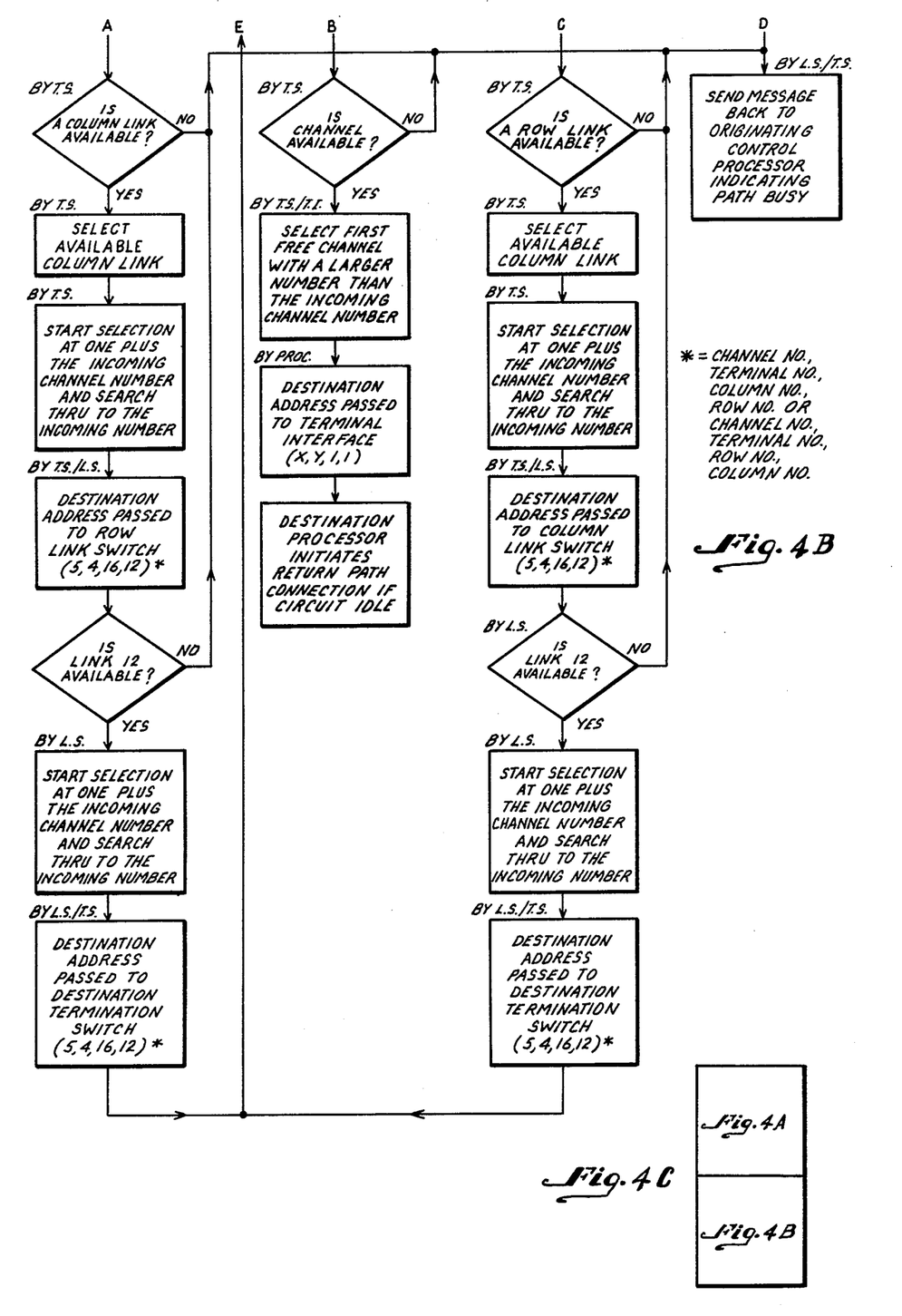

The flow chart of FIGS. 4A and 4B, when organized as illustrated in FIG. 4C, illustrates the possible path selection logic sequences for the digital switching network of FIG. 3. The various types of paths that can be chosen are: (1) Between termination ports of the same TS switch where only the TS switch is involved in path setup and control; (2) Between termination ports of different TS switches in the same row or column (in this case either a row or a column LS switch is used for the linkage); (3) Between termination ports of different TS switches in a different row and in a different column. (In this case either a column or a row LS switch is selected as the first linking switch, the TS switch that interconnects the row and column LS switch of the originating and terminating TS switch is used as the second linking switch in the connection. This TS switch, in turn, selects a row or a column LS switch, as appropriate, as the third linking switch in the connection. From this linking switch, a connection is made to the destination TS switch). Therefore, the worst case path involves five stages of switching for an end-to-end connection.

The algorithm illustrated in the flow chart used in routing in the Y network reflects the topology of the network. The flow chart also illustrates the fact that decisions on routing in the TS switch must be made based on the TS switch having its identity stored in the switch in the form of hard wiring. This is caused by the need to distinguish between the traffic which is to locally terminate and that which is to be passed on to some other TS switch for completion. It is assumed that the LS switches do not have to be programmed to recognize whether it is a row or a column. To accomplish this, it is assumed that the connecting TS switch organized the path selection message such that the first parameter in the message is the one the LS switch uses for connecting to the succeeding TS switch. This, of course, requires that the TS switch be aware of whether it is connecting to a row or to a column.

In the system architecture described herein clusters of lines or trunks identified as terminal clusters 104 in sets of 30 interfaced with a terminal interface arrangement 105 that provides multiple access to the network. By means of this multiple access facility, two or more independent planes can be provided whereby completely independent paths can be established, in the different planes, between any two terminations of the network.

The terminal capacity of the Y switch network is determined by the number of circuits (lines, trunks, etc.) that are accessed by each TS switch times the number of rows and columns of TS switches. In the case of a single terminal cluster 104 per TS switch combination port and with a LS switch of 16 ports, the maximum size is 64K. If two terminal clusters 104 are associated with each terminal interface 105, then the maximum size is 128K.

Figure 5:
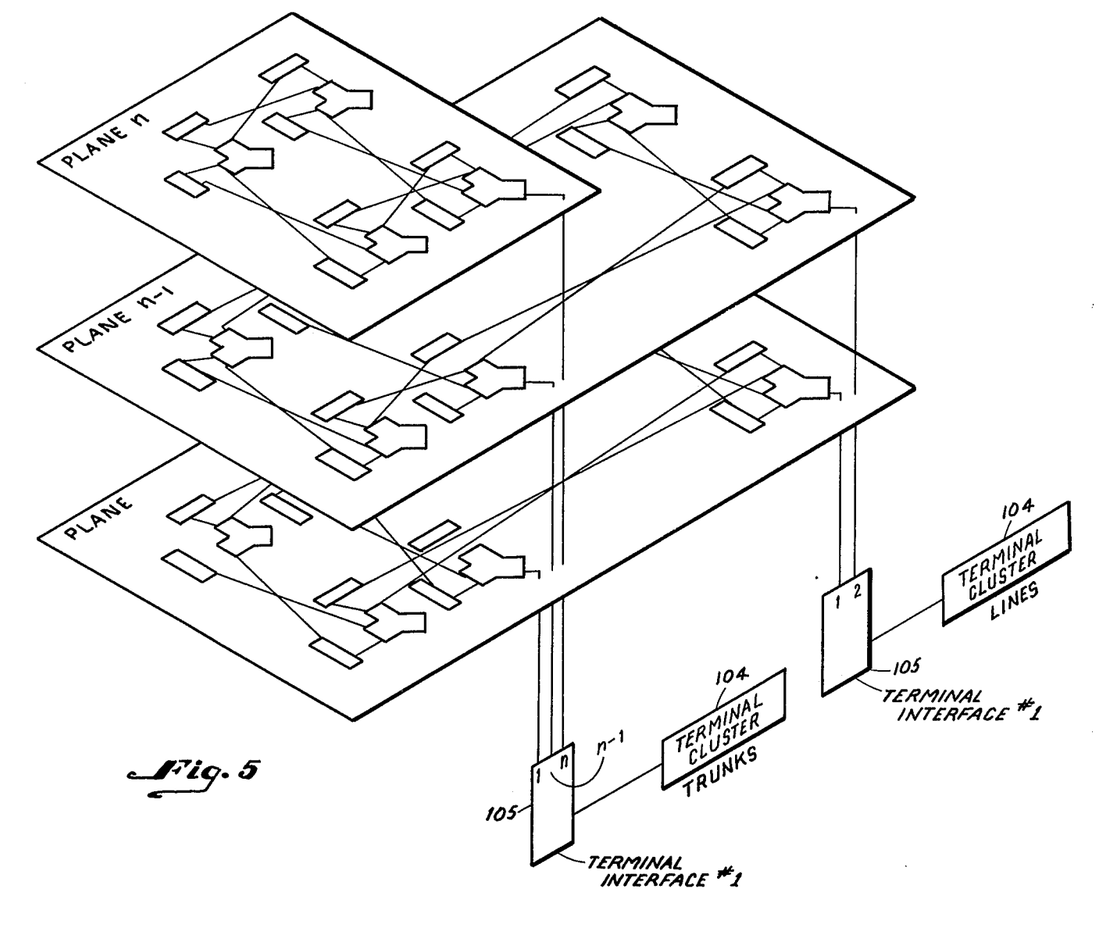
FIG. 5 illustrates terminal selectivity in a multiplane network of the type of FIG. 3.

FIG. 5 illustrates a unique characteristic of the topology chosen. It is possible to provide more planes for one portion of the terminals served than for some others. This facility allows the linking between high traffic terminals to be made stronger than that which is needed for line circuits. This type of structure also allows the on-line introduction of different implementation technologies since planes can be removed from service without complete loss of service to any terminal interface 105. This type of topology arrangement also provides the posibility to segregate particular types of traffic such as the tandem traffic associated with local/tandem (4/5) exchange while at the same time providing the necessary linking capacity between the lines and the trunks.

Figure 6:
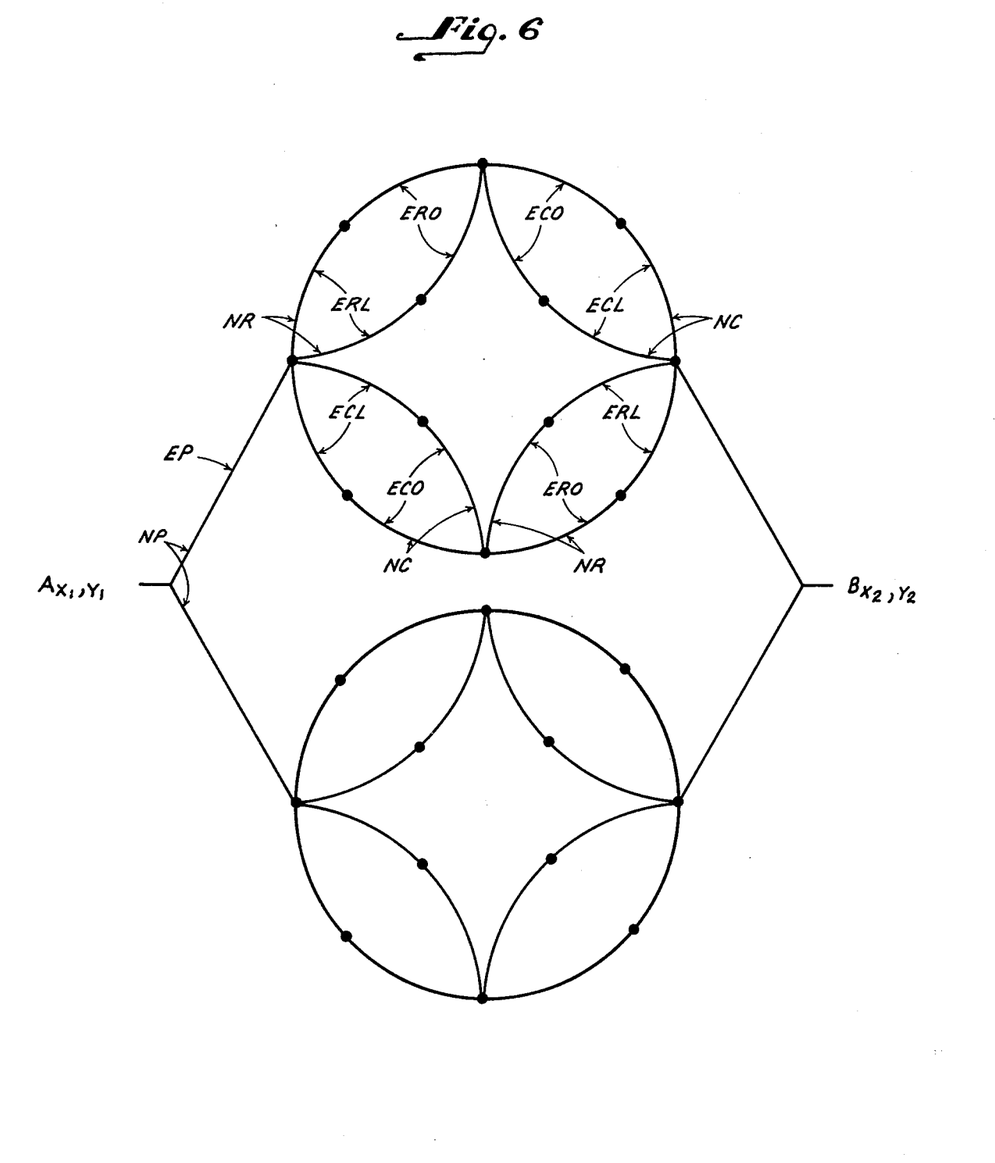
FIG. 6 is a linear graph illustrating the path choices for a call originating and terminating on different columns and rows from each other useful in evaluating the traffic capacity of the digital switching network of the present invention.

In order to evaluate the traffic capacity of the digital switching network of FIG. 3, a linear graph referred to as a Lee's Model is used to give first approximations of its blocking characteristics. The linear graph of FIG. 6 represents the path choices for a call originating and terminating in different rows and columns from each other. This represents the worst case path distance of five cascaded switches and six serial links.

The following terms are defined so that the linear graph equations may be constructed using the graph of FIG. 6:

TS=Terminating Switch
LS=Link Switch
EL=Average local TS traffic (originating plus terminating)
EA=Average system TS traffic (originating plus terminating)
EO=Average orthogonal TS traffic
EP=Occupancy of the plane access link
ERL=Occupancy of a local row link
ERO=Occupancy of an orthogonal row link
ECL=Occupancy of a local column link
ECO=Occupancy of an orthogonal column link
NP=Number of switch planes (TS sets)
NR=Number of row links (Row LS's/set)
NC=Number of column links (Column LS's/set)
R=Number of rows of termination switches per plane
C=Number of columns of termination switches per plane
T=Number of terminal interface links per TS Using the preceding definitions and referring to FIG. 3, assume that a call is to be placed from TS switch 1,16 to TS switch 16,1. The two sets of paths are via TS switch 16, 16 and TS switch 1,1. One set uses the associated column link switches on the first half of the path setup and then orthogonally routes through TS switch 16,16 and uses the associated row link switches LS to connect to the destination termination switch TS 16,1. The other set connects via the orthogonal TS termination switch 1,1 through the associated row switches LS and then orthogonally through TS switch 1,1 and the associated column LS switches to connect to the destination termination switch TS 16,1. In order to obtain some idea of the potential blocking of this call, the linear graph shown in FIG. 6 must be evaluated.

In order to evaluate the linear graph of FIG. 6, the probable link occupancies must be determined for each link in the various paths. If it is assumed that there is uniform usage of all links and paths between any two terminations, it would tend to suppress the problem of hot spots. Instead, three different terminal traffic figures are defined to allow a more realistic view of the effect on the link occupancies. These are:

EL—The average load generated by the circuits associated with an originating or terminating TS switch terminal interface link (this is the average originating plus terminating traffic for a terminal cluster of 30 circuits.

EO—The average load generated in the orthogonal TS switch (that TS switch in the path that is used to interconnect the row and the column portions of the path. In this case, the average originating plus terminating traffic reflects $8 \times 30 = 240$ circuits with a homogeneous mix of both lines, trunks and service circuits); and EA—The average load generated by all the other TS switches in the row and column. (This is, therefore, the average originating plus terminating traffic for $16 \times 240 - 1 \times 240 = 3600$ terminals that have a homogeneous mix of lines, trunks and service circuits).

It is assumed that the best way for all termination switches originating and terminating traffic to be split is one half in each direction. The nature of the orthogonal traffic is such that what enters the TS switch must leave the TS switch. Therefore, it too is split one half in each direction. The following link equations result:

$$EP = (EL/2NP)$$

$$ERL = (EL\ T/2\ NP\ NR)(1-1/(R\ C)) + (EA\ T/2\ NP\ NR)((C-1)(R-1)/(R\ C))$$

$$ERO = (EO\ T/2\ NP\ NR)(1-1/(R\ C)) + (EA\ T/2\ NP\ NR)((C-1)(R-1)/R\ C))$$

$$ECL = (EL\ T/2\ NP\ NC)(1-1/(R\ C)) + (EA\ T/2\ NP\ NC)((C-1)(R-1)/(R\ C))$$

$$ECO = (EO\ T/2\ NP\ NC)(1-1/(R\ C)) + (EA\ T/2\ NP\ NC)((C-1)(R-1)/(R\ C))$$

The linear graph shown in FIG. 6 was developed and its Lee's Model binomial equation for the blocking of a call between terminals located on both different rows and on different columns was calculated. The occupancy formulas previously defined were used to evaluate the various blocking circumstances.

Table A provides a maximum average traffic capacity comparison for single attempt blocking of 0.005 or less of the values presented in a study of the B1 terminal capacities and those obtained for the Y network for equivalent plane numbers equipped. In a sense, apples and oranges are being compared, since Erlang's loss formula was employed to produce the values for the B1 terminal and a binomial assumption was being used in obtaining the values of the Y network. As a result, the values should be used with discretion.

TABLE A

| NUMBER OF PLANES EQUIPPED | NETWORK TYPE | ALLOWABLE ORIGINATING TRUNK OCCUPANCY | | ALLOWABLE ORIGINATING LINE OCCUPANCY | MOST USED LINK OCCUPANCY |
|---|---|---|---|---|---|
| | | 50% TERMINAL CAPACITY UTILIZATION | 100% TERMINAL CAPACITY UTILIZATION | | |
| 1 | B1 | 0.290 | 0.145 | 0.145 | 0.500 |
| | Y | 1.000 | 0.500 | 0.500 | 0.938 |
| 2 | B1 | 0.634 | 0.290 | 0.290 | 0.500 |
| | Y | 1.000 | 1.000 | 1.000 | 0.468/0.938 |
| 3 | B1 | 0.952 | 0.434 | 0.434 | 0.500 |
| | Y | 1.000 | 1.000 | 1.000 | 0.625 |
| 4 | B1 | 1.000 | 0.500 | 0.500 (MAY BE 0.579) | 0.500 |
| | Y | 1.000 | 1.000 | 1.000 | 0.468 |

It should be noted that the number of network switches needed for the Y network is always less than that needed for the B1 network. In addition, it should also be noted that all Y network entries except for the 1 plane of values are near non-blocking (less than $1 \times 10^{-6}$).

It is important to note the level of occupancy that can exist in the Y network on its most used links. This very high value results from the very strong linkage between TS switches throughout the network. This multiple/-parallel structure (i.e., four LS switches linking the same end points) should allow the traditional 0.5 interior link occupancy limits to be exceeded. A level as high as 0.8 can be safely provided since with four link switches per row and column, a link load of 0.938 still shows a blocking probability of less than $1 \times 10^{-4}$ when all terminals are presenting a load of 1.0 and only one of the diagonal paths are utilized (see Table B3, last entry).

The Y network is structured to allow partial equipping on both a plane and on a link basis. Table A shows the effect of equipping 1 through 4 planes with the links held constant at 4 link switches per row and column. Tables B1 through B3 show the effect on blocking probabilities that vary the number of links per row and column from 2 through 4 has while holding the number of planes constant at two. The results show that it is not necessary to equip more than two planes for even toll system applications since, as previously stated, the system is near non-blocking at even 1.0 average occupancy on all terminals.

TABLE B1

| NUMBER OF LSU PER ROW AND COLUMN $N_R$ & $N_C$ | AVE SYSTEM TERMINAL OCCUPANCY $E_A$ | AVE ORIG. & TERM. TERMINAL OCCUPANCY $E_L$ | AVE ORTHOGONAL TERMINAL OCCUPANCY $E_O$ | SINGLE DIAGONAL USED LINK GRAPH BLOCKING $B_{SD}$ | BOTH DIAGONALS USED LINK GRAPH BLOCKING $B_{BD}$ |
|---|---|---|---|---|---|
| 2 | 0.2 | 0.1 | 0.1 | 0 | 0 |
| " | " | " | 0.5 | 0 | 0 |
| " | " | " | 0.7 | 0 | 0 |
| 2 | 0.2 | 0.5 | 0.1 | 0 | 0 |
| " | " | " | 0.5 | 0 | 0 |
| " | " | " | 0.7 | 0 | 0 |
| 2 | 0.2 | 0.7 | 0.1 | 0 | 0 |
| " | " | " | 0.5 | 0 | 0 |
| " | " | " | 0.7 | $5.2 \times 10^{-6}$ | 0 |
| 2 | 0.3 | 0.1 | 0.1 | 0 | 0 |
| " | " | " | 0.5 | 0 | 0 |
| " | " | " | 0.7 | 0.030 | 0.00093 |
| 2 | 0.3 | 0.5 | 0.1 | 0 | 0 |
| " | " | " | 0.5 | 0 | 0 |
| " | " | " | 0.7 | 0.030 | 0.0093 |
| 2 | 0.3 | 0.7 | 0.1 | 0 | 0 |
| " | " | " | 0.5 | 0.030 | 0.00093 |
| " | " | " | 0.7 | 0.21 | 0.044 |

TABLE B2

| NUMBER OF LSU PER ROW AND COLUMN $N_R$ & $N_C$ | AVE SYSTEM TERMINAL OCCUPANCY $E_A$ | AVE ORIG & TERM TERMINAL OCCUPANCY $E_L$ | AVE ORTHOGONAL TERMINAL OCCUPANCY $E_O$ | SINGLE DIAGONAL USED LINK GRAPH BLOCKING $B_{SD}$ | BOTH DIAGONALS USED LINK GRAPH BLOCKING $B_{BD}$ |
|---|---|---|---|---|---|
| 3 | 0.5 | 0.1 | 0.1 | 0 | 0 |
| " | " | " | 0.5 | 0 | 0 |
| " | " | " | 0.8 | 0 | 0 |
| 3 | 0.5 | 0.5 | 0.1 | 0 | 0 |
| " | " | " | 0.5 | 0 | 0 |
| " | " | " | 0.8 | 0 | 0 |
| 3 | 0.5 | 0.8 | 0.1 | 0 | 0 |
| " | " | " | 0.5 | 0 | 0 |
| " | " | " | 0.8 | 0 | 0 |
| 3 | 0.7 | 0.1 | 0.1 | 0 | 0 |
| " | " | " | 0.5 | 0 | 0 |
| " | " | " | 0.8 | 0.000076 | 0 |

TABLE B2-continued

| NUMBER OF LSU PER ROW AND COLUMN $N_R$ & $N_C$ | AVE SYSTEM TERMINAL OCCUPANCY $E_A$ | AVE ORIG & TERM TERMINAL OCCUPANCY $E_L$ | AVE ORTHOGONAL TERMINAL OCCUPANCY $E_O$ | SINGLE DIAGONAL USED LINK GRAPH BLOCKING $B_{SD}$ | BOTH DIAGONALS USED LINK GRAPH BLOCKING $B_{BD}$ |
|---|---|---|---|---|---|
| 3 | 0.7 | 0.5 | 0.1 | 0 | 0 |
| " | " | " | 0.5 | 0 | 0 |
| " | " | " | 0.8 | 0.000076 | 0 |
| 3 | 0.7 | 0.8 | 0.1 | 0.000075 | 0 |
| " | " | " | 0.5 | 0.000076 | 0 |
| " | " | " | 0.5 | 0.0028 | $8.0 \times 10^{-6}$ |

TABLE B3

| NUMBER OF LSU PER ROW AND COLUMN $N_R$ & $N_C$ | AVE SYSTEM TERMINAL OCCUPANCY $E_A$ | AVE ORIG & TERM TERMINAL OCCUPANCY $E_L$ | AVE ORTHOGONAL TERMINAL OCCUPANCY $E_O$ | SINGLE DIAGONAL USED LINK GRAPH BLOCKING $B_{SD}$ | BOTH DIAGONALS USED LINK GRAPH BLOCKING $B_{BD}$ |
|---|---|---|---|---|---|
| 4 | 0.7 | 0.1 | 0.1 | 0 | 0 |
| " | " | " | 0.5 | 0 | 0 |
| " | " | " | 1.0 | 0 | 0 |
| 4 | 0.7 | 0.5 | 0.1 | 0 | 0 |
| " | " | " | 0.5 | 0 | 0 |
| " | " | " | 1.0 | 0 | 0 |
| 4 | 0.7 | 1.0 | 0.1 | 0 | 0 |
| " | " | " | 0.5 | 0 | 0 |
| " | " | " | 1.0 | 0 | 0 |
| 4 | 1.0 | 0.1 | 0.1 | 0 | 0 |
| " | " | " | 0.5 | 0 | 0 |
| " | " | " | 1.0 | $7.4 \times 10^{-7}$ | 0 |
| 4 | 1.0 | 0.5 | 0.1 | 0 | 0 |
| " | " | " | 0.5 | 0 | 0 |
| " | " | " | 1.0 | $7.5 \times 10^{-7}$ | 0 |
| 4 | 1.0 | 1.0 | 0.1 | $7.4 \times 10^{-7}$ | 0 |
| " | " | " | 0.5 | $7.5 \times 10^{-7}$ | 0 |
| " | " | " | 1.0 | $1.0 \times 10^{-4}$ | 0 |

It should be noted that the average occupancy is across thirty circuits for EL, across 240 circuits for EO and 3600 circuits for EA. It should also be noted that for the case where the system is to be used as a large local with average line terminal loads of 0.1 or less and with normal trunking levels of 20% or less, it is only necessary to provide two links per row and column with two planes equipped.

Later comparisons will not take advantage of this fact in order to reflect a conservative position and to acknowledge the possible optimistic results obtained using Lee's Model.

Figure 7:
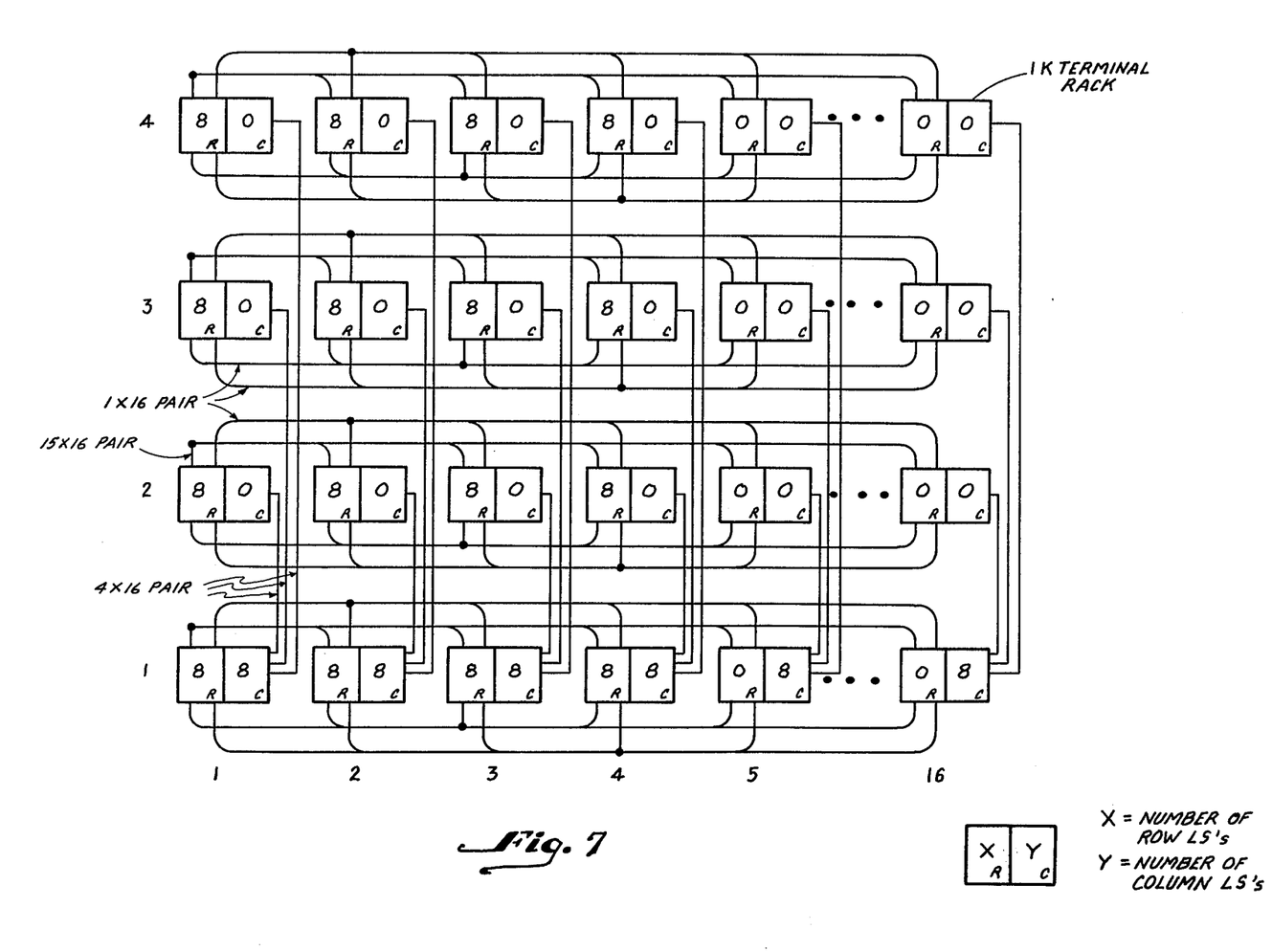
FIG. 7 is a block diagram illustrating a floor-plan like view of a 64,000 terminal exchange useful in demonstrating the growth of digital switching network of the present invention.

The Y network, since it is a nodal network, should be easier to effectively provision on a distributed basis. FIG. 7 shows a floor-plan like view of a 64K terminal exchange where it is assumed that each rack contains 960 terminals. The network was engineered at the two planes/four links per row and column level and a possible distribution made of the TS switches and LS switches. The switch counts and the inter-rack cabling is as shown. Table C shows the comparison between the Y and B1 network for the 64K size.

TABLE C

| NET. TYPE | RACK TYPE | RESIDENT NETWORK 16 PORT DEVICES | INTER RACK CABLES (16 PR) ORIG. | INTER RACK CABLES (16 PR) TERM. | INTA RACK PAIRS | TOTAL NUMBER OF RACKS IN 64K EXCHANGE BY- TYPE | TOTAL NUMBER OF RACKS IN 64K EXCHANGE BY- TOTAL |
|---|---|---|---|---|---|---|---|
| B1 | LINE RACK | 8 | 0 | 4 | 0 | 64 | 66 |
| B1 | 2nd & 3rd STAGE NETWORK RACK | 256 | 256 | 256 | 4096 | 1 | |
| B1 | 4th STAGE NETWORK RACK | 256 | 0 | 256 | 0 | 1 | |
| Y | TYPE A LINE RACK | 4 | 27 | 3 | 80 | 4 | 64 |
| Y | TYPE B LINE RACK | 16 | 15 | 7 | 16 | 12 | |
| Y | TYPE C LINE RACK | 16 | 12 | 4 | 64 | 12 | |
| Y | TYPE D LINE RACK | 8 | 0 | 8 | 0 | 36 | |

This table shows clearly that even the B1 network is not really a distributed network since the second, third and fourth stages are all concentrated on two full racks. This, of course, suggests serious cable routing and partial equipping problems.

The arrangement shown in FIG. 7 is not considered the optimum. Even so, this arrangement shows a substantial improvement in partial equipping. This is illustrated in Table D and the resulting graph of FIG. 8.

TABLE D

| NUMBER OF TERMINALS | B1 NETWORK[A] STAGES | | | | | Y NETWORK[B] | | | | B1>Y |
|---|---|---|---|---|---|---|---|---|---|---|
| | 1 | 2 | 3 | 4* | TOTAL | TERMINAL | COLUMN | ROW | TOTAL | |
| 1000 | 8 | 4 | — | — | 12 | 8 | 8 | — | 16 | −4 |
| 2000 | 16 | 8 | 32 | — | 56 | 16 | 8 | — | 24 | 32 |
| 3000 | 24 | 12 | 32 | — | 68 | 24 | 8 | — | 32 | 36 |
| 4000 | 32 | 16 | 32 | — | 80 | 32 | 8 | — | 40 | 40 |
| 5000 | 40 | 20 | 32 | — | 92 | 40 | 16 | 16 | 72 | 20 |
| 6000 | 48 | 24 | 32 | — | 104 | 48 | 16 | 32 | 96 | 8 |
| 7000 | 56 | 28 | 32 | — | 116 | 56 | 16 | 48 | 120 | −4 |
| 8000 | 64 | 32 | 32 | — | 128 | 64 | 16 | 64 | 144 | −16 |
| 9000 | 72 | 36 | 64 | 32 | 204 | 72 | 24 | 72 | 168 | 36 |
| 10000 | 80 | 40 | 64 | 64 | 248 | 80 | 24 | 80 | 184 | 64 |
| 11000 | 88 | 44 | 64 | 96 | 292 | 88 | 24 | 88 | 200 | 92 |
| 12000 | 96 | 48 | 64 | 128 | 336 | 96 | 24 | 96 | 216 | 120 |
| 13000 | 104 | 52 | 64 | 160 | 380 | 104 | 32 | 104 | 240 | 140 |
| 14000 | 112 | 56 | 64 | 192 | 424 | 112 | 32 | 112 | 256 | 168 |
| 15000 | 120 | 60 | 64 | 224 | 468 | 120 | 32 | 120 | 272 | 196 |
| 16000 | 128 | 64 | 64 | 256 | 512 | 125 | 32 | 128 | 288 | 224 |
| 17000 | 136 | 68 | 96 | 256 | 556 | 136 | 40 | 128 | 304 | 252 |
| 18000 | 144 | 72 | 96 | 256 | 568 | 144 | 40 | 128 | 312 | 256 |
| 19000 | 152 | 76 | 96 | 256 | 580 | 152 | 40 | 128 | 320 | 260 |
| 20000 | 160 | 80 | 96 | 256 | 592 | 160 | 40 | 128 | 328 | 264 |
| 40000 | 320 | 160 | 160 | 256 | 896 | 320 | 80 | 128 | 528 | 368 |
| 60000 | 480 | 240 | 256 | 256 | 1232 | 480 | 128 | 128 | 736 | 496 |

*THE NUMBER OF SWITCHES PROVIDED KEEP THE LINK RATIO FOR ALL STAGES 1:1
[A] FOUR PLANES EQUIPPED (WORST CASE LINE TRAFFIC 0.579E)
[B] TWO PLANES EQUIPPED (WORST CASE LINE OR TRUNK TRAFFIC 1E)

As shown, there is a substantial reduction in the number of switching elements over that of the B1 network be expected, the number of wires and cables also are substantially less than for the B1 network.

TABLE E

| NETWORK TYPE | 1,000 TERMINATIONS | | | 5,000 TERMINATIONS | | | 10,000 TERMINATIONS | | |
|---|---|---|---|---|---|---|---|---|---|
| | SWITCHES | INTER BAY CABLES* | INTRA BAY CABLES | SWITCHES | INTER BAY CABLES | INTRA BAY CABLES | SWITCHES | INTER BAY CABLES | INTRA BAY CABLES |
| Y | 16 | 0 | 5 | 72 | 14 | 13 | 184 | 41 | 22 |
| B1 | 12 | 4 | 0 | 92 | 20 | 32 | 248 | 56 | 40 |

| NETWORK TYPE | 20,000 TERMINATIONS | | | 40,000 TERMINATIONS | | |
|---|---|---|---|---|---|---|
| | SWITCHES | INTER BAY CABLES | INTRA BAY CABLES | SWITCHES | INTER BAY CABLES | INTRA BAY CABLES |
| Y | 328 | 124 | 36 | 528 | 264 | 56 |
| B1 | 592 | 176 | 96 | 896 | 320 | 160 | at almost all levels.

When the layout of FIG. 7 was done, it was not yet clear how many row links would be needed to keep a safe level of service when only a row link direction was available for routing. As a result of the calculation above, it is now felt that the third and fourth links would either not be needed (in the large local case) or would only be needed at the greater than 32K size (in the large toll case).

Figure 8:
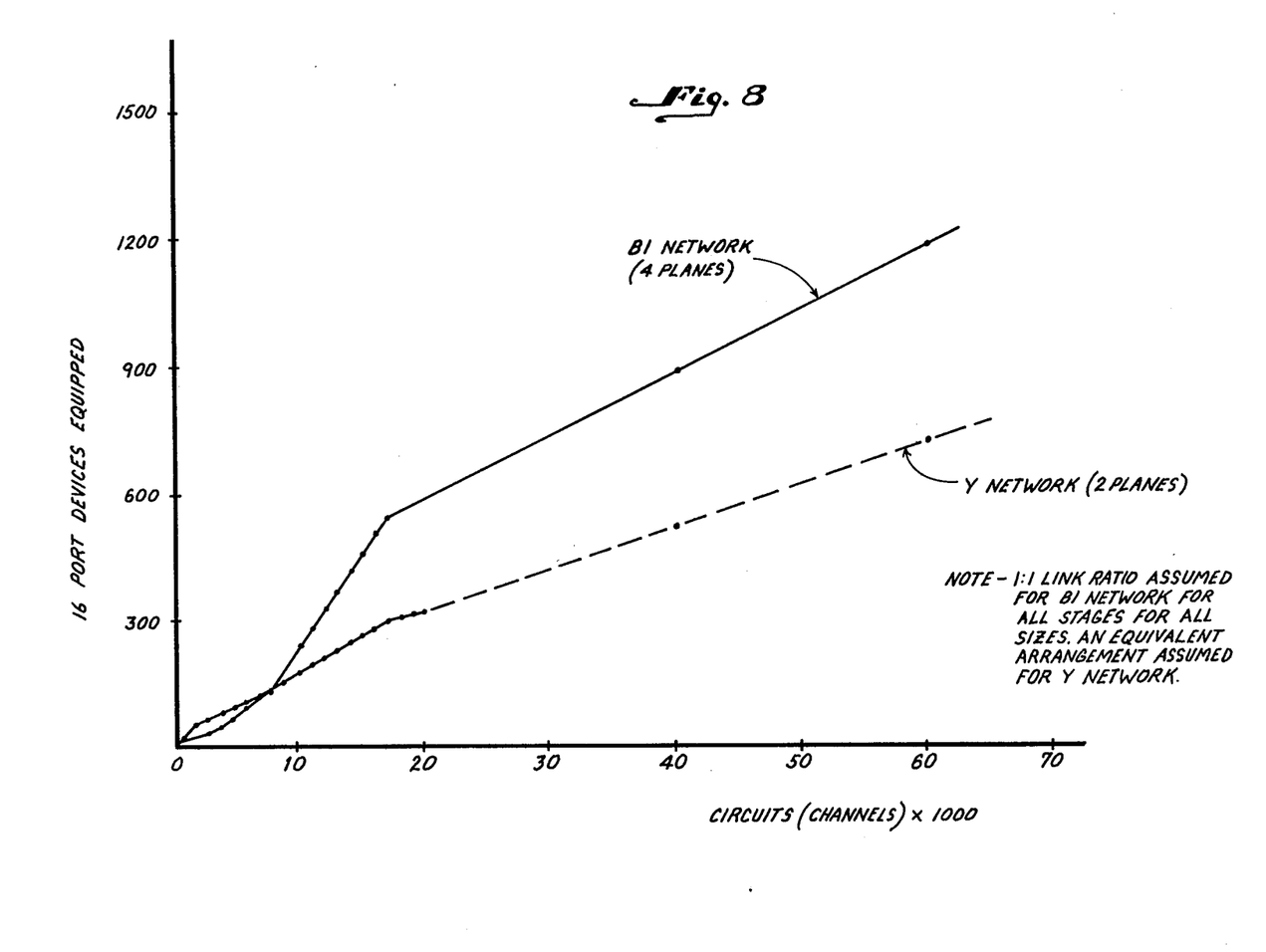
FIG. 8 is a graph illustrating a comparison between the equipping of the B1 network and the Y network of the present invention.

In addition, the slope of the curve in FIG. 8 for the Y network remains almost constant for the full range of sizes; and, in fact, has a lesser value than that of the B1 network even at the larger sizes.

Figure 9:
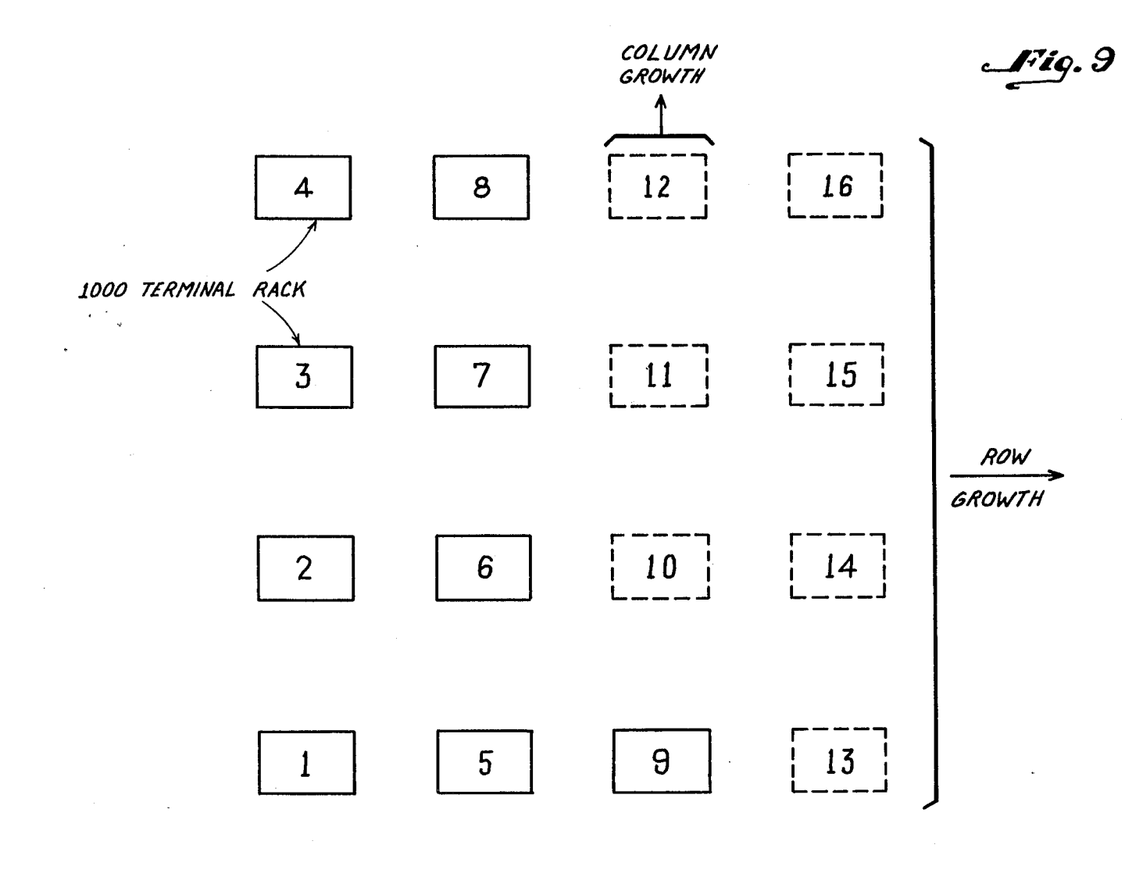
FIG. 9 is a block diagram illustrating the Y network terminal growth plan.

Table E provides a comparison between the two network types for the full range of sizes. It is assumed that all switches are equipped with 16 ports and all cables are 16 pairs. The Table E shows that, as should FIG. 9 shows the strategy used when adding new racks. A given column is filled prior to the beginning of a new column. This results in a row column configuration that is generally rectangular and never has more than one column partially equipped. This is desirable for reasons of blocking since the arrangement defined provides only row-column path linking (single path) for all terminals not in the rectangle that includes rack 9 in the case of the example of FIG. 9. This is why the blocking value is given for a single path blocking in all the relevant tables. If the criteria of no cable movement is not important, then it is possible by interconnecting row and column link switches LS directly in a partially equipped column to always provide a two path configuration.

I claim:

1. A switching network for selectively interconnecting a plurality of digital terminals by transmission paths through said network comprising:
   in at least one plane including
      MN switching means arranged in M rows and N columns orthognally related to each other, where M and N are even integers, each of said MN switching means having a first plurality of ports coupled to a plurality of digital terminals, a second plurality of ports each associated with a different one of said M rows and a third plurality of ports each associated with a different one of said N columns, said first, second and third plurality of ports being interconnected internally of each of said MN switching means;
      first intermediate switching devices associated with said M rows, wherein a plurality of said intermediate switching devices are associated with each row, each having a fourth plurality of ports such that one of said ports is associated with each of the second plurality of ports of each of said MN switching means in each row;
      second intermediate switching devices associated with said N columns, wherein a plurality of said intermediate switching devices are associated with each column, each having a fourth plurality of ports such that one of said ports is associated with each of the third plurality of ports of each of said MN switching means in each column;
      each of said first, second, third, and fourth plurality of ports having two oppositely directed external unidirectional paths coupled thereto, each of said unidirectional paths having a plurality of channels transmitted thereon in a time division format, each of said plurality of channels carrying digital information and digital control information for a different one of said plurality of terminals;
      said MN, first intermediate and second intermediate switching means, being responsive to said control information originating at one terminal to establish said transmission path through said network.

2. A network according to claim 1, wherein each of said MN switching means has internally thereof a plurality of parallel buses equal in number to said plurality of channels interconnecting the associated one of said first, second and third plurality of ports.

3. A network according to claim 2, wherein each of said first intermediate switching means has internally thereof a plurality of parallel buses equal in number to said plurality of channels interconnecting the associated one of said fourth plurality of ports.

4. A network according to claim 3, wherein each of said second intermediate switching means has internally thereof a plurality of parallel buses equal in number to said plurality of channels interconnecting the associated one of said fourth plurality of ports.

5. A network according to claim 4, wherein each of said second and third plurality of ports is equal in number to one half of said first plurality of ports.

6. A network according to claim 5, wherein the fourth plurality of ports is equal in number to the sum of the MN switching means in a row or column.

7. A network according to claim 6, wherein M and N are each equal to 16 or less.

8. A network according to claim 7, wherein each of said intermediate switching devices associated with a given row is equal to 4 or less in number.

9. A network according to claim 8, wherein each of said intermediate switching devices associated with a given column is equal to 4 or less in number.

10. A network according to claim 9, wherein said plurality of channels is equal to 24 or 32 in number.

11. A network according to claim 1, wherein each of said first intermediate switching means has internally thereof a plurality of parallel buses equal in number to said plurality of channels interconnecting the associated one of said fourth plurality of ports.

12. A network according to claim 1, wherein each of said second intermediate switching means has internally thereof a plurality of parallel buses equal in number to said plurality of channels interconnecting the associated one of said fifth plurality of ports.

13. A network according to claim 1, wherein each of said second and third plurality of ports is equal in number to one half of said first plurality of ports.

14. A network according to claim 1, wherein each of said fourth plurality of ports is equal in number to either the sum of said row MN switching means or column MN switching means.

15. A network according to claim 1, wherein M and N are each equal to 16 or less.

16. A network according to claim 1, wherein each of said intermediate switching groups associated with each column is equal to 4 or less in number.

17. A network according to claim 1, wherein each of said intermediate switching groups associated with each row is equal to 4 or less in number.

18. A network according to claims 1, 2, 3, 4, 5, 6, 7, 8, 9, 10, 11, 12, 13, 14, 15, 16 or 17, wherein said network includes a plurality of said planes.

19. A network according to claims 1, 2, 3, 4, 5, 6, 7, 8, 9, 10, 11, 12, 13, 14, 15, 16 or 17, wherein said network includes a plurality of said planes, certain ones of said plurality of planes including additional ones of said MN switching means, said first intermediate switching means and said second intermediate switching means.

20. A network according to claim 1, wherein MN switching means are selectively interconnected such that each MN switching device in a row or column is directly connected to all other MN switching means in the same row and column.

* * * * *